Jan. 10, 1961 C. E. CLOUD ET AL 2,967,493
METHOD AND APPARATUS FOR APPLYING NUTS TO CANDY
Filed Sept. 24, 1957

INVENTORS
Charles E. Cloud &
William S. Cloud
By: Jones, Durbo & Robertson
Attys.

United States Patent Office 2,967,493
Patented Jan. 10, 1961

2,967,493

METHOD AND APPARATUS FOR APPLYING NUTS TO CANDY

Charles E. Cloud, Wilmette, Ill., and William S. Cloud, 625 Park Ave., Wilmette, Ill.; said Charles E. Cloud assignor to said William S. Cloud Filed Sept. 24, 1957, Ser. No. 685,992

11 Claims. (Cl. 107—1)

One of the most popular types of candy bar is a chocolate-covered bar in which the center portion is formed of a caramel or fudge, or combination thereof, with peanuts surrounding and partially embedded in the outer layer or surface. The chocolate not only forms a coating but also fills the interstices between the nuts left by the center. Bars of this type are manufactured in quantities running into millions per week. The production of such bars by current methods has been considered to be reasonably efficient and economical, although it has been recognized for years that too much hand labor has been involved for maximum economy.

According to the present invention further economy is achieved by a radical change in manufacturing procedures and apparatus. Some advantages from the standpoint of taste and uniformity in the finished product also result.

It is important for the nuts or nut fragments to be embedded in the soft-candy centers. Even if this were not necessary to satisfy the public taste, it would be necessary from a manufacturing standpoint because the nut-bearing centers must be passed through the chocolate enrobing station, and it would not maintain its desired shape if the nut fragments were merely loosely gathered around the centers. According to one manufacturing method extensively used in the past, the fudge centers have been cast, then after being freed from the molds some hours later (after setting) they have been passed through a caramel enrobing machine, and from that usually through a curtain of falling nuts or nut fragments, being tumbled in or adjacent to this curtain to ensure an adequate coating of nuts. Then they were carried on a lengthy series of conveyors in a refrigerated room for cooling and tumbled some more to knock off excess nuts. After this they have to be realigned, for passing through the chocolate enrober. Several of these steps were not as simple as they might sound. The casting required temporary production of cornstarch molds and large storage facilities for permitting the fudge to set. The curtain of falling peanuts required a recirculation of nuts at the rate of about a ton per minute, in a large scale production.

According to the present invention, a center of cold fudge surrounded by a layer of cold caramel is continuously extruded upwardly through a bed of nuts or nut fragments and after being coated with nuts by means of this invention is drawn onto a horizontal conveyor where the continuous length is cut into sections of the right lengths for forming nut-coated centers or bars, ready to be carried into the chocolate enrobing machine.

The passage of the continuous fudge and caramel strip up through the nuts is not enough to produce the nut-covered strand required, and even more clearly is inadequate to embed or impress the nuts as is desired. According to the present invention this is accomplished by providing an annular diaphragm surrounding the pool of nuts through which the strand passes and pulsating this diaphragm toward the strand by pulsating pneumatic pressure applied in a chamber surrounding the diaphragm and formed in part by a sleeve carrying it.

The application of the compressed air is in rapid bursts or pulsations; the diaphragm first squeezes nuts into the caramel layer forming the outside of the strand and then withdraws to allow the pool of nuts to reform around the strand to again receive the pressing action from the diaphragm on the next pulsation thereof. It has been found that a very uniform coating of nuts or nut fragments can be applied in this manner, with the fragments sufficiently embedded to stay in place during the further handling, even though the extruded strand is cool and not extremely sticky. The great majority of nuts which do not get embedded fall off immediately and remain in the pool. The amount of nuts in the nut coating can be varied with reasonably accurate uniformity by adjusting the pressure or frequency of the pulsations.

A number of the extruding units may be arranged in a line for extruding the strands up through their pools of nuts, fed from a common source being drawn in parallel relationship onto the conveyor. All strands may be severed simultaneously by a single reciprocating blade and delivered to a higher speed conveyor which separates the bars in each line so that they are suitably arranged to pass through the enrobing machine. Accordingly they remain perfectly aligned as they pass through the enrobing machine, through a cooling zone for solidifying the chocolate coating and into the packaging section where their perfect alignment facilitates wrapping them first individually, and then placing them in boxes.

Additional objects and advantages of the invention will be apparent from the following description and from the drawing.

Designation of figures

General description

Although the following disclosure offered for public dissemination is detailed to ensure adequacy and aid understanding, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the parts, improvements, or combinations in which the inventive concepts are found.

Figure 1:
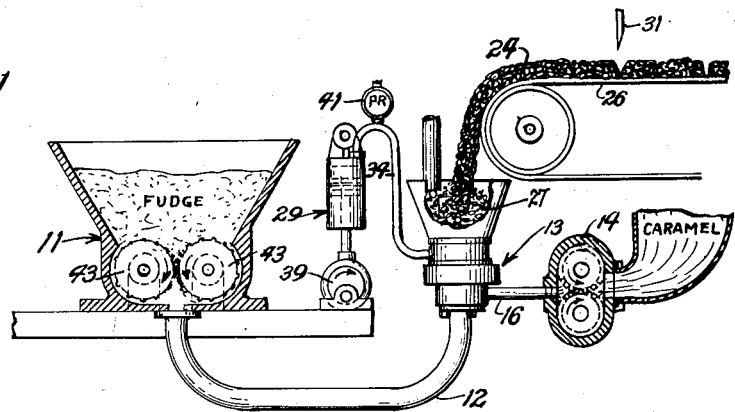
Figure 1 is a somewhat diagrammatic general view of apparatus chosen for illustration of this invention.

According to the illustrated form of the invention, fudge is fed by a feeding device 11 (Fig. 1), through a conduit 12 and through an extrusion unit 13. Simultaneously, caramel is fed by a gear pump 14 through a conduit 16 through the extruding head 13.

Figure 2:
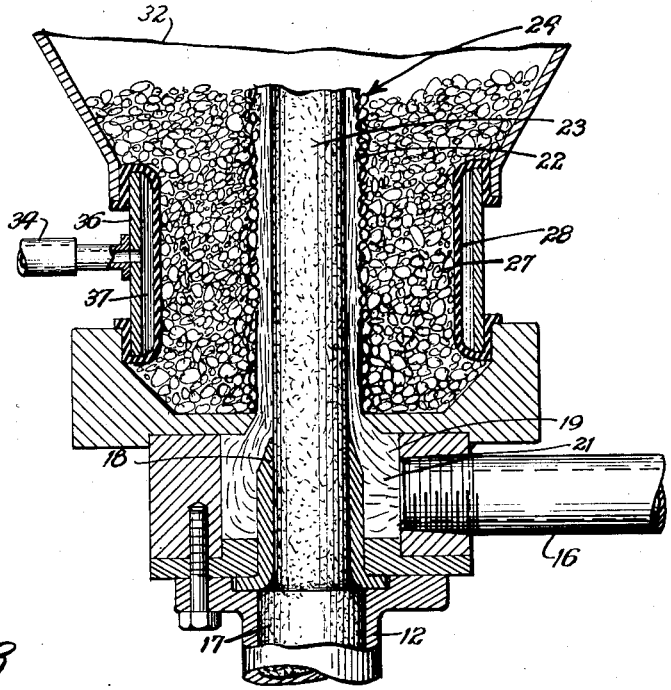
Figure 2 is a vertical cross-sectional view of the nut-embedding portion of the apparatus shown in Figure 2.

As seen in Figure 2, the conduit 12 delivers the fudge 17 through a central orifice 18, while the conduit 16 delivers caramel 19 through an annular chamber 21 from which the caramel is extruded as a tube surrounding and in contact with the core 23 of fudge.

The composite strand 24 is drawn by conveyor 26 upwardly through a pool 27 of nuts or nut fragments. These nuts are pressed toward the strand 24 and embedded in its outer layer 22 by an annular diaphragm 28 which is pulsated toward and from the strand 24. The pulsations are produced by an oscillating pumping device 29 seen in Figure 1. The strand 24 with nuts embedded therein is severed into lengths of the desired size for candy bars by a slicer 31, automatically driven by means not shown.

Nut embedding unit

Because the fudge caramel strand 24 is already cooled at the time of extrusion, the nuts do not cling to it easily. Furthermore, actual embedding of the nuts into the caramel is desirable from the standpoint of the finished product. The nuts or nut fragments may be embedded satisfactorily in the cold caramel by a pulsating annular diaphragm 28.

Figure 3:
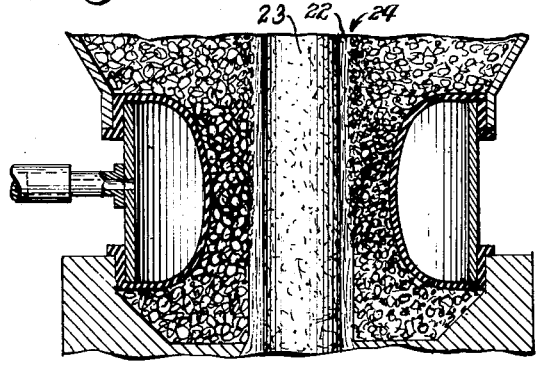
Figure 3 is a fragmentary view similar to Figure 1 but showing the embedding diaphragm extended inwardly to press the nuts into the candy strand.

In the normal position of diaphragm 28 shown in Figure 2, the diaphragm 28 is spaced far enough from the strand 24 for the size of the nuts or nut fragments being used to fall freely between the diaphragm and the nuts previously embedded in the caramel. A half-inch clearance has been found enough with finely cracked nuts, but a greater clearance will have more versatility. A funnel discharges nuts into the upper end of the space thus formed. The strand 24 therefore is drawn up through a pool 27 of nuts. As the strand 24 is being extruded and drawn upwardly, a momentary burst of compressed air is supplied through conduit 34 and sleeve 36, to the expansion chamber 37 formed between diaphragm 28 and sleeve 36. This blast of air stretches diaphragm 28 to or toward the position shown in Figure 3 so that it presses nuts or nut fragments into the caramel layer 22 of strand 24. The compressed air is immediately withdrawn so that the diaphragm 28 may collapse back to its original position.

The pulsations are provided at sufficiently close intervals so that the entire length of the strand 24 is coated as it is drawn through the pool.

Pulsations or momentary air blasts are supplied by pumping device 29. This may comprise a cylinder and reciprocating piston as illustrated, driven by a suitable means such as eccentric 39. It will be understood that the driving means for the eccentric 39 as well as for the other parts have been omitted for simplicity. Each may be independently variable in speed.

The pump 29 does not have any outlet valve and hence is free to draw air from conduit 34 as well as to pump air into it. Its outlet or conduit 34 is provided with a pressure relief valve 41 so as to limit the pressure in pressure chamber 37 to a safe value suitable for embedding the nuts. Preferably pressure relief valve 41 is adjustable. The amount of pressure delivered to the diaphragm 28 can thus be adjusted to control the amount of nut fragments clinging to strand 24 as it passes from the pool. Similar control can also be exercised by varying the speed of eccentric 39. Speeds at least up to 120 r.p.m. have been found satisfactory.

The return stroke of the piston preferably creates suction to draw the air back in, and hold the diaphragm against sleeve 36 more than half the time cycle. Minute leakage is usually present to supply enough air to satisfy requirements in case valve 41 is changed to a higher pressure; or a restricted inlet would be provided, or an adjustable vacuum relief valve.

Multiple extrusion and severing

It has been found convenient to provide a line of extrusion units approximately aligned with the edge of the conveyor 26 so that the conveyor can draw the strands 24 from each of the extrusion units. A diaphragm 28 separately surrounds each strand, but it may be most convenient to supply the various pools of nuts within the diaphragm from a common funnel feeding all of them, and surrounding the entire line of strands 24.

The belt 26 is preferably driven through a speed adjusting device with infinitesimal variations such as a Reeves drive. The speed should be slightly higher than the highest speed of extrusion to dependably keep the strands drawn out straight.

The same severing blade 31 may sever all of the strands simultaneously. The pieces from each strand then move forwardly in one line onto another conveyor which moves faster to space the pieces apart lengthwise.

The alignment of the pieces or bars of candy may be maintained through the chocolate enrober, through the cooler and into the packaging unit. Thus, the bars will be dependably delivered in each line with uniform spacing and alignment suitable for the packaging unit.

Feed devices

The feed device 11 may comprise a pair of corrugated rolls 43 running in close proximity. If found necessary for feeding a type of candy that cannot be dependably fed by two such rolls, a pair of preliminary feed rolls may be provided with a wider spacing between them.

It is preferred to arrange the fudge feeder 11 and conduit 12 to provide the least possible resistance to the flow of the fudge. This safeguards against changing the character of the fudge if it is stiff and high pressures would result if there were much resistance to its flow. It also tends to ensure success in feeding by corrugated rolls instead of some more positive feed device which might change the character of the fudge, and probably would be more expensive. In present practice the feed rolls 43 are arranged one above the other and feed horizontally, so that only one curve in conduit 12 is required. A conduit is used of cross section as wide as the line of extrusion devices so as to feed to them all with substantially equal friction. In the next machine, it is planned to arrange feed rolls 43 almost directly below the extruders, to feed upwardly, so conduit 12 will have no curve and minimum length. The fudge will be delivered to the feed rolls, or a preliminary pair by an inclined belt conveyor.

Gear pumps suitable for pumping cold caramel (which functions as a viscous liquid) are known. Ordinary piping may be used. It has been found desirable to use flow controlling devices in the various pipes to maintain equality of extrusion between the different strands. This has not, so far, been necessary on the fudge, but partly because the caramel extrusion tends to make up any minor deficiency in the thickness of the fudge core. It will be observed that the fudge core forms the inner element of the caramel extruder so that the extrusion space is larger when the core is smaller.

In large scale operations, caramel and nuts will be supplied relatively continuously and automatically. For example, the fudge can be delivered by a belt, and the caramel can be piped from the cooking vat (being cooled somewhere in its path before extrusion). The nuts can be fed by gravity through a device for keeping the funnel filled to a given level.

The diaphragm 28 can be formed of soft, vulcanized rubber, such as that which is used, for example, for the bladders of inflatable balls. The rubber used could of course be one of the synthetic varieties and in fact any sufficiently elastic and impervious or nearly impervious material could be used.

Automatic slicers such as that indicated at 31 are known in the candy making industry. Preferably, the blade is moved forward generally at the speed of the candy as it moves down into the candy, and out; and is withdrawn therefrom with a snap movement to free it from the sticky candy. It may also be given a slight forward and rearward jiggle prior to or simultaneously with the snap withdrawal movement to help free it from the candy. The material known commercially as "Teflon" (polytetrofluoroethylene), has been found by us to be extremely suitable for the slicing blade.

Although this invention was developed especially for the type of candy bar with respect to which it has been described, some users of the invention may naturally prefer variations of the bar. In fact, some of the aspects of the invention appear to be capable of widely different uses. For example, the extrusion of cold caramel about a core simultaneously extruded from another material permits the use of lower melting point materials for the core than have previously been practical in large scale production with hot caramel. Also, very soft materials, such as marshmallow, can be used. Other edible particles can be substituted for nuts.

Even with a fudge core, the extrusion of cold caramel has advantages. The strand retains its shape. The intervention of cooling, with its requirement for lengthy conveyors, before the next step is not required. At the same time, it appears that the broader aspects of the invention can even avoid the diaphragm and cold extrusion features. If the caramel is extruded in hot form, it may be sticky enough to pick up nut fragments without the aid of a pulsating diaphragm by the simple expedient of extruding and drawing the strand through a pool of nuts or nut fragments.

We claim:

1. Apparatus for making candy including a sleeve, an annular diaphragm sealed over the inside of the sleeve to form an expansion chamber therewith, means for supplying nut particles to the position surrounded by the diaphragm, means for passing a strand of pliable candy through the space surrounded by the diaphragm, and means for supplying compressed air in pulsations to the expansion chamber and permitting the air to escape from such space between pulsations to stretch the pulsating diaphragm toward the strand passing therethrough and thereby press the particles into successive portions of the pliable candy.

2. Candy making apparatus according to the preceding claim in which the means for passing the strand through the space surrounded by the diaphragm includes a conveyor which draws the strand from the space and carries the nut-bearing strand along the conveyor, and means associated with the conveyor for severing the strand into separate bars.

3. Apparatus for making candy including means for extruding a core of candy, means for extruding around the core and in contact therewith a tubular layer of a separate pliable candy, a container associated with said means for receiving the extruded candy through the bottom, means for drawing the candy up from the container, and means for supplying nut particles to the container, said container including a sleeve surrounding the upwardly moving strand of candy, and an elastic diaphragm carried by the sleeve on the inside thereof and sealed to it to form a chamber for receiving compressed air; and means for intermittently supplying compressed air in the chamber and permitting it to escape for giving the diaphragm a pulsating action toward and from the strand passing therethrough for embedding nut particles in the pliable candy of the strand.

4. Apparatus for making candy including means for extruding a core of candy, means for extruding around the core and in contact therewith a tubular layer of a separate pliable candy, a container associated with said means for receiving the extruded candy through its bottom, means for drawing the candy up from the container, and means for supplying nut particles to the container, said container including a sleeve surrounding the upwardly moving strand of candy, and an elastic diaphragm carried by the sleeve on the inside thereof and sealed to it to form a chamber for receiving compressed air; reciprocating pump means for alternately forcing air into the chamber and drawing air from the chamber and for giving the diaphragm a pulsating action toward and from the strand passing therethrough for embedding nut particles in the soft candy of the strand.

5. Candy-making apparatus according to claim 4 in which the movement of the diaphragm has a frequency and extent to alternately press nut particles into the strand and allow particles to fall between the strand and diaphragm.

6. The method of making candy including the steps of extruding upwardly through a pool of nut particles a strand of pliable candy, pulsatingly squeezing the contents of the pool toward said strand with enough force to embed nut particles into said pliable candy, and replenishing the pool between squeezes.

7. Apparatus for making candy including means to extrude a strand of pliable candy, means for supplying nut particles in contact with the strand, and means moving toward and from the strand for pressing the particles into successive portions of the strand to embed them therein.

8. The method of making a food product, including the steps of extruding upwardly through a pool of food particles a strand of pliable food material, pulsatingly squeezing the contents of the pool toward said strand with enough force to embed particles into said pliable candy, and replenishing the pool between squeezes.

9. Apparatus for making a food product, including means to extrude a strand of pliable food material, means for supplying food particles in contact with the strand, and means moving toward and from the strand for pressing the particles into successive portions of the strand to embed them therein.

10. Apparatus for making candy including means to form a strand of pliable, tacky candy and move it axially, means for supplying nut particles in contact with the strand including means for maintaining a pool of loose nuts through which the strand moves and actuated means moving toward and from the strand for pressing the particles into successive portions of the strand to impress them therein to secure them thereto.

11. Apparatus for making candy including means to form a strand of pliable candy and move it axially and means for impressing nut particles into the strand including means for maintaining a pool of loose nuts in contact with the moving strand and including a member beyond said pool from the strand which is moved toward the strand to impress nut particles of the pool into the strand before they have a chance to dislodge from and be left by a portion of the strand as the strand leaves the zone where the nuts are pressed into it.

References Cited in the file of this patent

UNITED STATES PATENTS

| | | |
|---|---|---|
| 1,265,853 | Wiseman | May 14, 1918 |
| 1,393,144 | Laskey | Oct. 11, 1921 |
| 1,576,339 | Laskey | Mar. 9, 1926 |
| 1,759,928 | Allen | May 27, 1930 |
| 2,433,140 | McCaughey | Dec. 23, 1947 |